United States Patent
Hough et al.

(10) Patent No.: US 10,167,722 B2
(45) Date of Patent: Jan. 1, 2019

(54) DISK OUTER RIM SEAL

(71) Applicant: United Technologies Corporation, Hartford, CT (US)

(72) Inventors: Matthew Andrew Hough, West Hartford, CT (US); Jeffrey S. Beattie, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 371 days.

(21) Appl. No.: 15/021,374

(22) PCT Filed: Sep. 10, 2014

(86) PCT No.: PCT/US2014/054940
§ 371 (c)(1),
(2) Date: Mar. 11, 2016

(87) PCT Pub. No.: WO2015/038605
PCT Pub. Date: Mar. 19, 2015

(65) Prior Publication Data
US 2016/0222788 A1    Aug. 4, 2016

Related U.S. Application Data

(60) Provisional application No. 61/877,108, filed on Sep. 12, 2013.

(51) Int. Cl.
*F01D 5/08*    (2006.01)
*F01D 5/30*    (2006.01)
(Continued)

(52) U.S. Cl.
CPC ............ *F01D 5/082* (2013.01); *F01D 5/081* (2013.01); *F01D 5/12* (2013.01); *F01D 5/3007* (2013.01);
(Continued)

(58) Field of Classification Search
CPC .......... F01D 5/081; F01D 5/082; F01D 5/084; F01D 5/085; F01D 5/3015; F01D 5/3007; F01D 11/006
See application file for complete search history.

(56) References Cited

U.S. PATENT DOCUMENTS 3,008,689 A    11/1961   Morley et al.
3,709,632 A    1/1973    Emmerson et al.
(Continued)

FOREIGN PATENT DOCUMENTS

WO    WO9514157 A1    5/1995
WO    WO2015073112 A2    5/2015

OTHER PUBLICATIONS

International Searching Authority, PCT Notification of Transmittal of the International Search Report and the Written Opinion, dated Dec. 23, 2014, 12 pages.
(Continued)

*Primary Examiner* — Jason Shanske
*Assistant Examiner* — Behnoush Haghighian
(74) *Attorney, Agent, or Firm* — Kinney & Lange, P.A.

(57) ABSTRACT

A turbine section comprises a rotor, blade and rim seal. The rotor comprises a rim defining an outer diameter surface, and a slot in the outer diameter surface. The blade comprises an airfoil, a platform surrounding the airfoil, a shank extending from the platform, a root extending from the shank for connecting to the slot, and a nub extending from the shank beneath the platform. The rim seal is disposed between the outer diameter surface and the nub. A method for cooling an outer diameter of a rotor disk comprises bleeding cooling air in a gas turbine engine, passing the flow of cooling air through a cover plate that retains a seal plate against the rotor disk, leaking the cooing air between a rotor disk rim
(Continued)

and the seal plate, and guiding the cooling air across an outer diameter surface of the rotor disk rim utilizing a rim seal.

18 Claims, 5 Drawing Sheets

(51) Int. Cl.
  *F01D 5/12* (2006.01)
  *F01D 11/00* (2006.01)
(52) U.S. Cl.
  CPC .......... *F01D 5/3015* (2013.01); *F01D 11/006* (2013.01); *F01D 5/084* (2013.01); *F01D 5/085* (2013.01); *F05D 2220/32* (2013.01); *F05D 2260/232* (2013.01)

(56) References Cited

U.S. PATENT DOCUMENTS

| | | | |
|---|---|---|---|
| 4,029,436 A | 6/1977 | Shoup, Jr. et al. | |
| 4,326,835 A | 4/1982 | Wertz | |
| 4,457,668 A | 7/1984 | Hallinger | |
| 4,743,164 A | 5/1988 | Kalogeros | |
| 4,854,821 A | 8/1989 | Kernon et al. | |
| 5,281,097 A | 1/1994 | Wilson et al. | |
| 5,388,962 A * | 2/1995 | Wygle | F01D 5/082 416/220 R |
| 5,415,526 A * | 5/1995 | Mercadante | F01D 5/081 416/190 |
| 5,518,369 A | 5/1996 | Modafferi | |
| 5,800,124 A | 9/1998 | Zelesky | |
| 6,682,307 B1 | 1/2004 | Tiemann | |
| 6,837,686 B2 | 1/2005 | Di Paola et al. | |
| 7,241,109 B2 * | 7/2007 | Ferra | F01D 5/081 415/174.5 |
| 7,811,058 B2 * | 10/2010 | Tibbott | F01D 5/081 416/193 A |
| 7,874,799 B2 * | 1/2011 | Young | F01D 11/04 415/115 |
| 8,602,734 B2 * | 12/2013 | Philippot | F01D 5/081 415/115 |
| 8,807,942 B2 * | 8/2014 | Tibbott | F01D 5/081 416/193 A |
| 9,366,142 B2 * | 6/2016 | Butkiewicz | F01D 5/08 |
| 2007/0110580 A1 | 5/2007 | Tibbott et al. | |
| 2011/0027103 A1 | 2/2011 | Philippot | |
| 2012/0082568 A1 * | 4/2012 | Tibbott | F01D 5/081 416/97 R |
| 2013/0108446 A1 * | 5/2013 | Butkiewicz | F01D 5/08 416/95 |

OTHER PUBLICATIONS

Extended European Search Report for EP Application No. 14843866.6, dated Sep. 12, 2016, 8 Pages.

* cited by examiner

DISK OUTER RIM SEAL

STATEMENT OF GOVERNMENT INTEREST

This invention was made with government support under Contract No. FA8650-09-D-2923-0021 awarded by The United States Air Force. The government has certain rights in the invention.

BACKGROUND

The present disclosure relates generally to cooling of gas turbine engine components and more specifically to cooling of rotor disks in gas turbine engines.

Gas turbine engines operate by passing a volume of high energy gases through a plurality of stages of vanes and blades, each having an airfoil connected to a rotor disk, in order to drive turbines to produce rotational shaft power. The shaft power is used to drive a compressor to provide compressed air to a combustion process to generate the high energy gases. Additionally, the shaft power may be used to drive a generator for producing electricity (such as in an industrial gas turbine), or to drive a fan for producing high momentum gases for producing thrust (such as in a turbofan). In order to produce gases having sufficient energy to drive the compressor, generator and fan, it is necessary to combust the fuel at elevated temperatures and to compress the air to elevated pressures, which also increases its temperature. Thus, the vanes and blades are subjected to extremely high temperatures, often times exceeding the melting point of the alloys comprising the airfoils. High pressure turbine blades and rotor disks are subject to particularly high temperatures.

In order to maintain gas turbine engine turbine components at temperatures below their melting point, it is necessary to, among other things, cool the components with a supply of relatively cooler air, typically bled from the compressor. The cooling air can be directed into the component to provide convective cooling internally, or across the component to provide film cooling externally. For example, cooling air can be passed between turbine blade platforms and the outer diameter rim of the rotor disk to remove heat from the component, and subsequently discharged into the gas path. Various blade-to-disk attachment systems have been devised to route cooling air across the outer rim of the rotor disk. For example, U.S. Pat. No. 5,800,124, which is assigned to United Technologies Corporation, describes one system for directing cooling air to the outer rim of a rotor disk. There is a continuing need to improve cooling of turbine components to increase the temperature to which the component can be exposed, thereby increasing the overall efficiency of the gas turbine engine.

SUMMARY

In one embodiment, the present disclosure is directed toward a turbine section for a gas turbine engine. The turbine section comprises a rotor, a blade and a rim seal. The rotor comprises a rim defining an outer diameter surface, and a slot through the rim across the outer diameter surface. The blade comprises an airfoil, a platform surrounding a base of the airfoil, a shank extending from the platform opposite the airfoil, a root extending from the shank for connecting to the slot, and a nub extending from the shank beneath the platform. The rim seal is disposed between the outer diameter surface and the nub.

In another embodiment, the present disclosure is directed toward a method for cooling an outer diameter of a rotor disk in a gas turbine engine. The method comprises bleeding a flow of cooling air in a gas turbine engine, passing the flow of cooling air through a cover plate that retains a seal plate against the rotor disk, leaking the flow of cooing air between a rotor disk rim and the seal plate, and guiding the flow of cooling air across an outer diameter surface of the rotor disk rim utilizing a rim seal.

DETAILED DESCRIPTION

Figure 1:
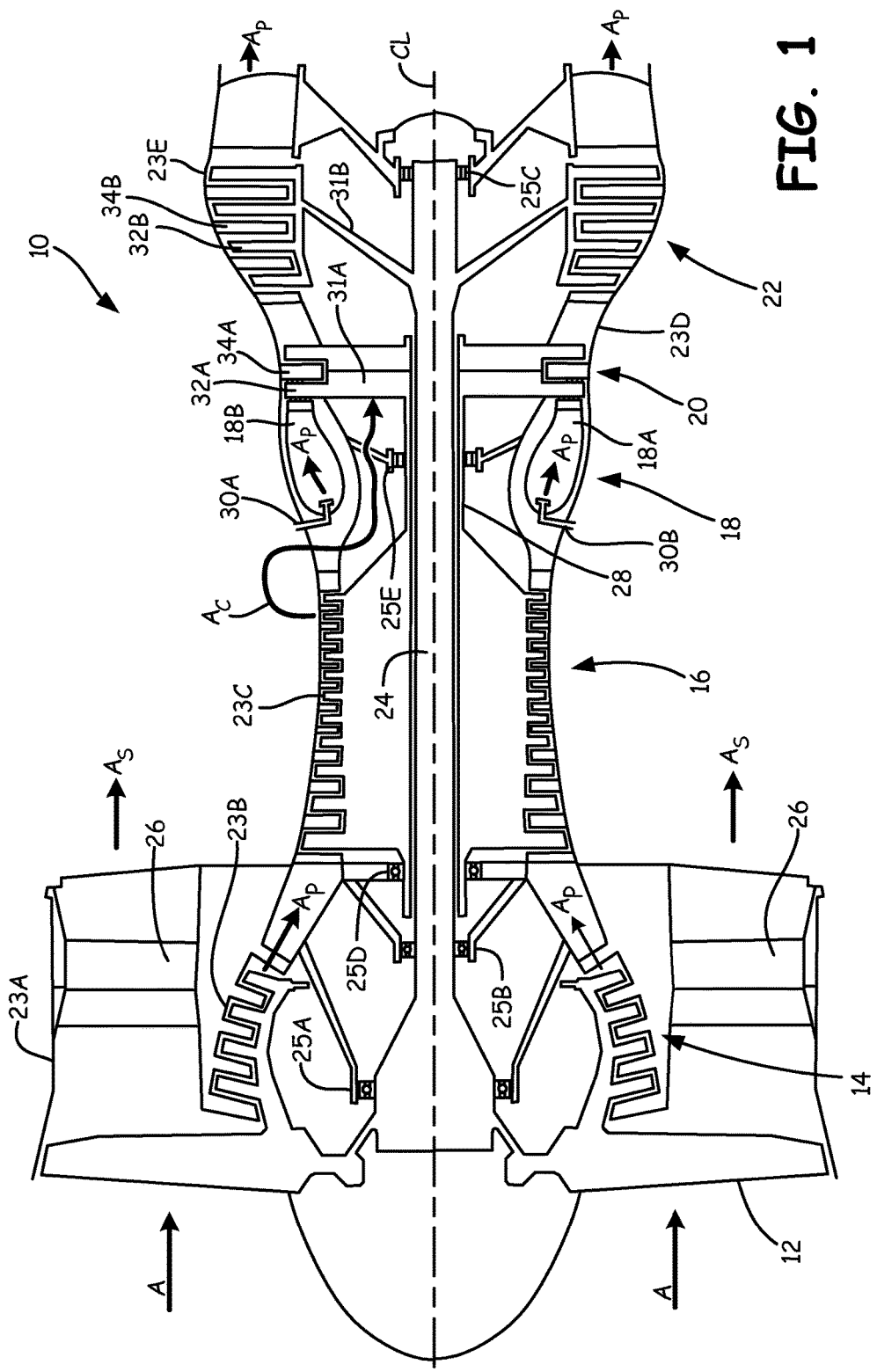
FIG. 1 is a schematic of a gas turbine engine having a high pressure turbine section in which a disk outer rim seal of the present disclosure is used.

FIG. 1 shows a schematic of gas turbine engine 10, in which the disk outer rim seal of the present disclosure is used. Gas turbine engine 10 comprises a dual-spool turbofan engine having fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E such that an air flow path is formed around centerline CL. Although depicted as a dual-spool turbofan engine in the disclosed non-limiting embodiment, it should be understood that the concepts described herein are not limited to use with turbofans as the teachings may be applied to other types of turbine engine, such as three-spool turbine engines and geared fan turbine engines.

Inlet air A enters engine 10 and it is divided into streams of primary air $A_P$ and secondary air $A_S$ after it passes through fan 12. Fan 12 is rotated by low pressure turbine 22 through shaft 24 to accelerate secondary air $A_S$ (also known as bypass air) through exit guide vanes 26, thereby producing a major portion of the thrust output of engine 10. Shaft 24 is supported within engine 10 at ball bearing 25A, roller bearing 25B and roller bearing 25C. Low pressure compressor (LPC) 14 is also driven by shaft 24. Primary air $A_P$ (also known as gas path air) is directed first into LPC 14 and then into high pressure compressor (HPC) 16. LPC 14 and HPC 16 work together to incrementally step-up the pressure of primary air A. HPC 16 is rotated by HPT 20 through shaft 28 to provide compressed air to combustor section 18, which includes inlet guide vanes 29. Shaft 28 is supported within engine 10 at ball bearing 25D and roller bearing 25E. The compressed air is delivered to combustors 18A and 18B, along with fuel through injectors 30A and 30B, such that a combustion process can be carried out to produce the high energy gases necessary to turn turbines 20 and 22, as is known in the art. Primary air $A_P$ continues through gas turbine engine 10 whereby it is typically passed through an exhaust nozzle to further produce thrust.

HPT 20 and LPT 22 each include a circumferential array of blades extending radially from rotors 31A and 31B connected to shafts 28 and 24, respectively. Similarly, HPT 20 and LPT 22 each include a circumferential array of vanes extending radially from HPT case 23D and LPT case 23E, respectively. Specifically, HPT 20 includes blades 32A and vanes 34A, and LPT 22 includes blades 32B and vanes 34B. Blades 32A are inserted into slots within rotors 31A. Compressed cooling air $A_C$ from, for example, HPC 16 is directed to provide cooling to rotors 31A relative to the hot combustion gasses. Disk outer rim seals of the present disclosure are inserted between the outer rims of rotors 31A and the platforms of blades 32A to limit heat exposure to rotors 31A. Although described with reference to blade 32A, the outer rim seals of the present disclosure may be used in other gas turbine engine components, such as turbine vanes, compressor blades, compressor vanes, fan blades and the like.

Figure 2:
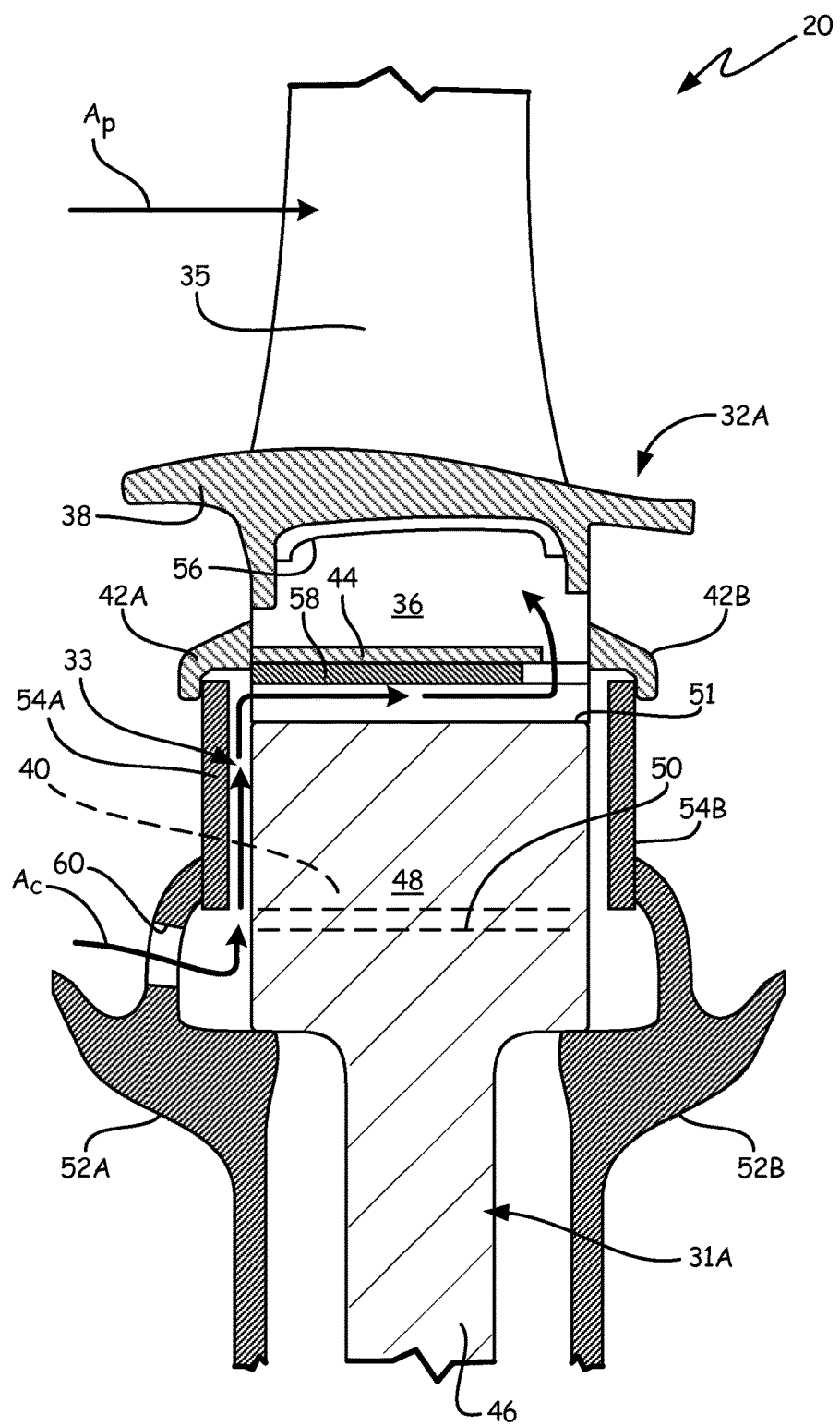
FIG. 2 is a cross-sectional view of the high pressure turbine section of FIG. 1 showing a cooling path through a high pressure turbine blade shank attached to a slot in a rotor disk rim.

FIG. 2 is a cross-sectional view of a portion of high pressure turbine section 20 of FIG. 1 showing cooling path 33 for cooling air $A_C$ between high pressure turbine blade 32A and rotor 31A. HPT blade 32A comprises airfoil 35, shank 36, platform 38, root 40, seal hooks 42A and 42B and seal nubs 44. Rotor 31A includes disk 46, rim 48, slot 50 and outer diameter (OD) surface 51. High pressure turbine section 20 also includes forward cover plate 52A, aft cover plate 52B, forward seal plate 54A, aft seal plate 54B, gap seal 56 and rim seal 58. Airfoil 35 and platform 42 extend from shank 36, which is coupled to rotor 31A through interconnection of root 40 with slot 50. Slot 50 extends into OD surface 51 of rim 48, which is connected to disk 46. As shown in FIG. 1, disk 46 of rotor 31A connects to HPT shaft 28 (FIG. 1) such that turbine blade 32A and rotor 31A rotate about engine centerline CL (FIG. 1). Cover plates 52A and 52B are coupled to disk 46 by any suitable means in order to hold seal plates 54A and 54B in place in conjunction with seal hooks 42A and 42B. Seal plates 54A and 54B close-off slot 50 from primary air $A_P$ and form cooling path 33 for cooling air $A_C$. In FIG. 2, cooling path 33 is exaggerated to more readily show flow of cooling air $A_C$.

Hot combustion gases of primary air $A_P$ are generated within combustor 18 (FIG. 1) upstream of turbine section 20 and flow through a gas path defined radially outward of platform 38. Due to the elevated temperatures of primary air $A_P$, cooling air $A_C$ is provided to slot 50 and shank 36 to purge or prevent hot gas from passing through platform 38 and circumventing gap seal 56. Gap seal 56 is positioned to seal between mate faces of adjacent platforms 38. Gap seal 56 may provide a damping function to platform 38. For example, cooling air $A_C$, which is relatively cooler than primary air $A_P$, may be routed from high pressure compressor 16 (FIG. 1) driven by high pressure turbine 20. Likewise, airfoil 36 and root 40 may include internal cooling passages to receive portions of cooling air $A_C$.

Figure 4:
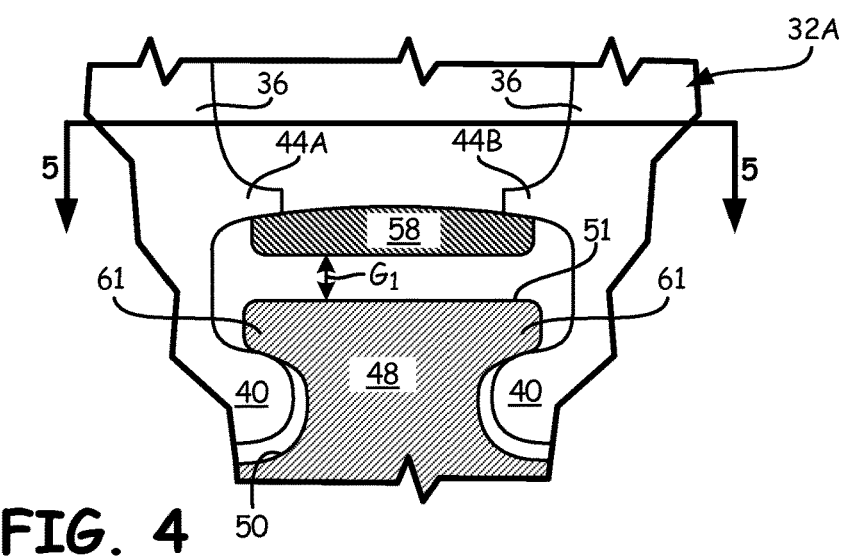
FIG. 4 is a section view of adjacent turbine blade shanks in slots of the rotor of FIG. 3 showing the outer rim seal relative to retention nubs positioned on the blade shanks.
Figure 5:
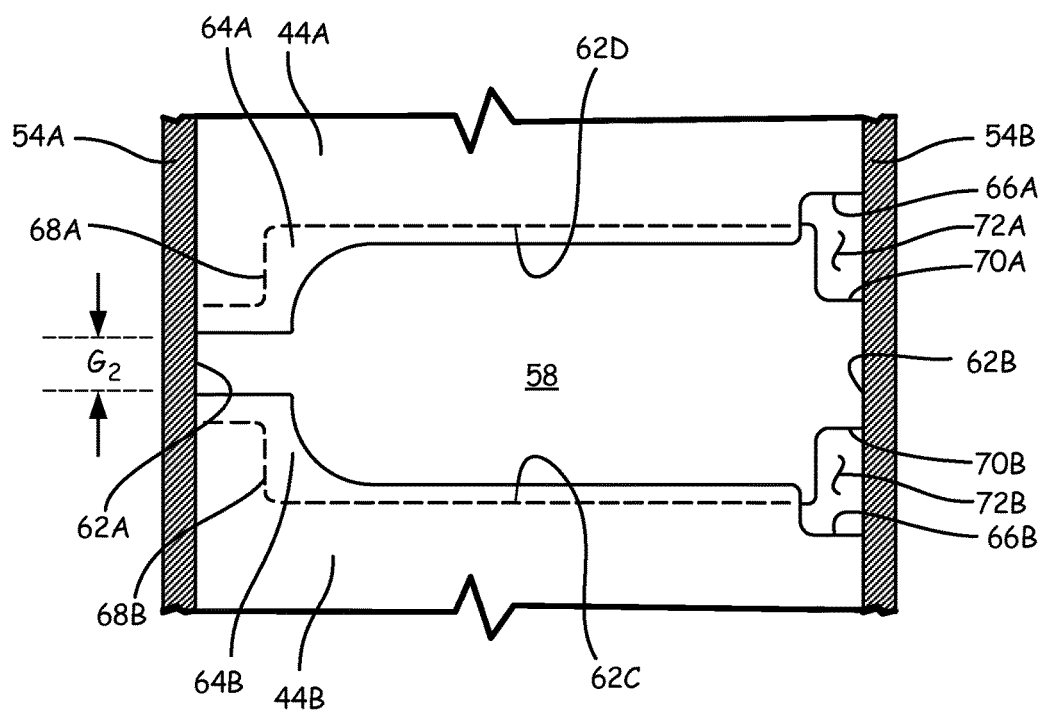
FIG. 5 is section 5-5 of FIG. 4 showing the shape of the outer rim seal relative to the shape of the retention nubs.

Cooling air $A_C$ enters cover plate 52A through opening 60 and flows outward between seal plate 54A and rim 48. Cooling air $A_C$ enters slot 50 where it is able to enter into internal cooling passages of blade 32A that extend through root 40, shank 36, platform 38 and into airfoil 35. Some of cooling air $A_C$ travels past slot 50 to OD surface 51 and is turned to OD surface 51 by hook 42A. As such, cooling path 33 for cooling air $A_C$ relies on leakage of the cooling air between rim 48 and seal plate 54A in the disclosed embodiment. Rim seal 58, which is held in position by nub 44, directs cooling air $A_C$ across OD surface 51. Rim seal 58 and nub 44 are configured to form a gap toward the trailing edge of blade 32A to allow cooling air $A_C$ to to enter the vicinity of shank 36 to provide additional cooling or purging. However, both rim seal 58 and nub 44 extend across the entirety of OD surface 51 (as shown in FIGS. 4 and 5) to maximize sealing and support of rim seal 58. The shape, position and function of rim seal 58 is discussed in further detail with reference to FIGS. 3-5.

Figure 3:
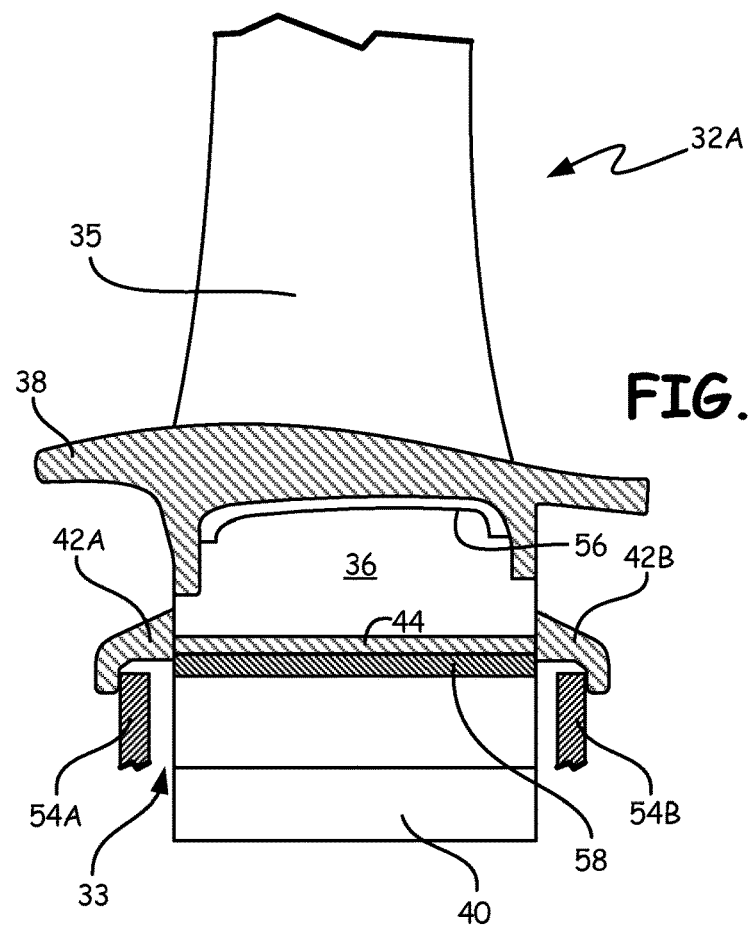
FIG. 3 is a partial view of the high pressure turbine section of FIG. 2 showing a disk outer rim seal positioned between a blade platform and rotor disk rim.

FIG. 3 is a partial view of high pressure turbine section 20 of FIG. 2 showing rim seal 58 positioned under blade platform 38 radially inward of nub 44. FIG. 3 includes the same reference numerals as described with respect to FIG. 2. FIG. 3 shows root 40 positioned at the radial inner end of shank 36, with nub 44 being located on shank 36 between platform 38 and root 40. As shown in FIG. 3, nub 44 and shank 36 extend all the way across OD surface 51, but include cut-out features (as shown in FIG. 5) to allow cooling air $A_C$ to enter the space underneath platform 38. Nub 44 forms a protuberance along which rim seal 58 engages. FIG. 3 shows, for example, a pressure side of airfoil 35 wherein nub 44 extends circumferentially from a pressure side of shank 36. However, blade 32 also includes a nub that is a mirror image of nub 44 located along the suction side of shank 36. As such, adjacent nubs 44 (which are labeled 44A and 44B in FIGS. 4 and 5) support rim seal 58.

FIG. 4 is a section view of adjacent turbine blade shanks 36 in slots 50 of rotor 31A of FIG. 3 showing outer rim seal 58 relative to retention nubs 44A and 44B positioned on blade shanks 36. Rim 48 includes slots 50, which form lugs 61.

Blade shanks 36 extend radially inward and terminate at roots 40. In the disclosed embodiment, roots 40 comprise dovetail shaped features for mating with slots 50. In other embodiments, however, roots 40 and slots 50 may form a firtree interface. Roots 40 are inserted into slots 50 such that lugs 61 overhang lobes of roots 40 and blades 32A are prevented from radially exiting slots 50. Space is provided between roots 40 and slots 50 to allow cooing air $A_C$ to enter slots 50 and the interior of blades 32A.

Nubs 44A and 44B extend laterally, or generally circumferentially, from shanks 36. As shown in FIG. 4, nubs 44A and 44B have a generally trapezoidal shape with filleted areas joining to shank 36 in one embodiment. In other embodiments, nubs 44A and 44B can have other cross-sectional shapes. Nubs 44A and 44B extend laterally only far enough as needed to support rim seal 58 and need not extend to contact each other. Nubs 44A and 44B extend over, e.g. radially outward of, roots 40 and thereby form a pocket with roots 40 into which lugs 61 and rim seal 58 are positioned.

When engine 10 (FIG. 1) is operating, centrifugal force urges rim seal 58 outward to contact nubs 44A and 44B, allowing cooling air $A_C$ to enter gap $G_1$. Nubs 44A and 44B are positioned close to OD surface 51, depending on the thickness of rim seal 58, in order to allow flow of cooling air $A_C$, but to not allow rim seal 58 too much freedom to move so as to avoid vibration. In one embodiment, gap $G_1$ is from about 0.020 inches (~0.508 mm) to about 0.080 inches (~2.032 mm). Additionally, gap $G_1$ is maintained small to decrease the space produced between OD surface 51 and rim seal 58, thereby increasing the velocity of cooling air $A_C$ within gap $G_1$ and increasing the heat transfer rate.

FIG. 5 is section 5-5 of FIG. 4 showing the shape of outer rim seal 58 relative to the shape of retention nubs 44A and 44B. Seal plates 54A and 54B are positioned to be in close contact with nubs 44A and 44B. Rim seal 58 is positioned underneath nubs 44A and 44B and extends from seal plate 54A to seal plate 54B. Rim seal 58 includes leading edge 62A, trailing edge 62B, pressure side 62C and suction side 62D. Nub 44A includes wing 64A and notch 66A. Nub 44B includes wing 64B and notch 66B.

Nubs 44A and 44B include wings 64A and 64B, respectively, that flare circumferentially toward each other. Wings 64A and 64B form gap $G_2$. Gap $G_2$ meters flow of cooling air $A_C$ into slot gap $G_1$ (FIG. 4). Gap $G_2$ is sized to be as small as possible to prevent loss of cooling air $A_C$, while also avoiding situations where adjacent HPT blades 32A might come in to contact. For example, it is desirable to avoid having cooling air $A_C$ leak out of cooling path 33 (FIG. 3) past the interface of seal plate 54A and nubs 44 in order to increase the amount of cooling of OD surface 51. But, it also desirable to avoid contact of nubs 44 to avoid inducing vibration, particularly at resonance, in adjacent blades 32A. In one embodiment, gap $G_2$ is from about 0.01 inches (~0.254 mm) to about 0.020 inches (~0.508 mm).

Nubs 44A and 44B include notches 66A and 66B, respectively, that recede circumferentially away from each other. Notches 66A and 66B widen the area between nubs 44A and 44B to more readily allow cooling air $A_C$ to escape past rim seal 58. Wings 64A and 64B and notches 66A and 66B produce a "bottle-shaped" gap between nubs 44A and 44B.

Rim seal 58 includes leading edge notches 68A and 68B and trailing edge notches 70A and 70B. Rim seal 58 is shaped as an elongate body that is generally circumferentially wide enough to rest on nubs 44A and 44B forward of trailing edge notches 70A and 70B. Leading edge 62A is cut-back to form notches 68A and 68B that reduce the width of rim seal 58 at wings 64A and 64B. Notches 68A and 68B reduce the mass of rim seal 58 due to the added support from wings 64A and 64B. At trailing edge 62B, notches 70A and 70B reduce the width of rim seal 58 at notches 66A and 66B of nubs 44A and 44B to produce openings 72A and 72B. Openings 72A and 72B allow for cooling air $A_C$ to escape from gap $G_1$ (FIG. 4), past rim seal 58 and into the shank region of blades 32A. In one embodiment, notches 68A and 68B are identical to notches 70A and 70B such that rim seal 58 is reversible in the leading-edge-to-trailing-edge direction, thereby providing a level of mistake-proofing in the assembly of rim seal 58.

Rim seal 58 shields OD surface 51 from direct and indirect heat from primary air $A_P$ (FIGS. 1 & 2). Exposure of rotors 31A (FIG. 1), including rim 48 and disk 46, to high temperatures, such as those reached by primary air $A_P$, reduce the life of the components, particularly at OD surface 51. In order to directly counter the heat exposure, rotors 31A would either need to be fabricated from materials having higher temperature limits, which is expensive, or would need to be made more robust, which adds weight. The combination of seal plate 54A and rim seal 58 directs a portion of cooling air $A_C$ that leaks past seal plate 54A across OD surface 51 to reduce the temperature of rim 48, thereby increasing its life and reducing its size and cost. Furthermore, rim seal 58 and seal plates 54A and 54B are of simple geometries that are easy to manufacture. For example, rim seal 58 may comprise a simple stamped rectangle, and seal plates 54A and 54B may comprise a stamped arcuate segment. Rim seal 58 and seal plates 54A and 54B can be made of the lightest material that can withstand the temperature gradient between the shank region of blade 32A and cooling air $A_C$. For example, the components can be made of a stainless steel alloy in one embodiment.

Figure 6:
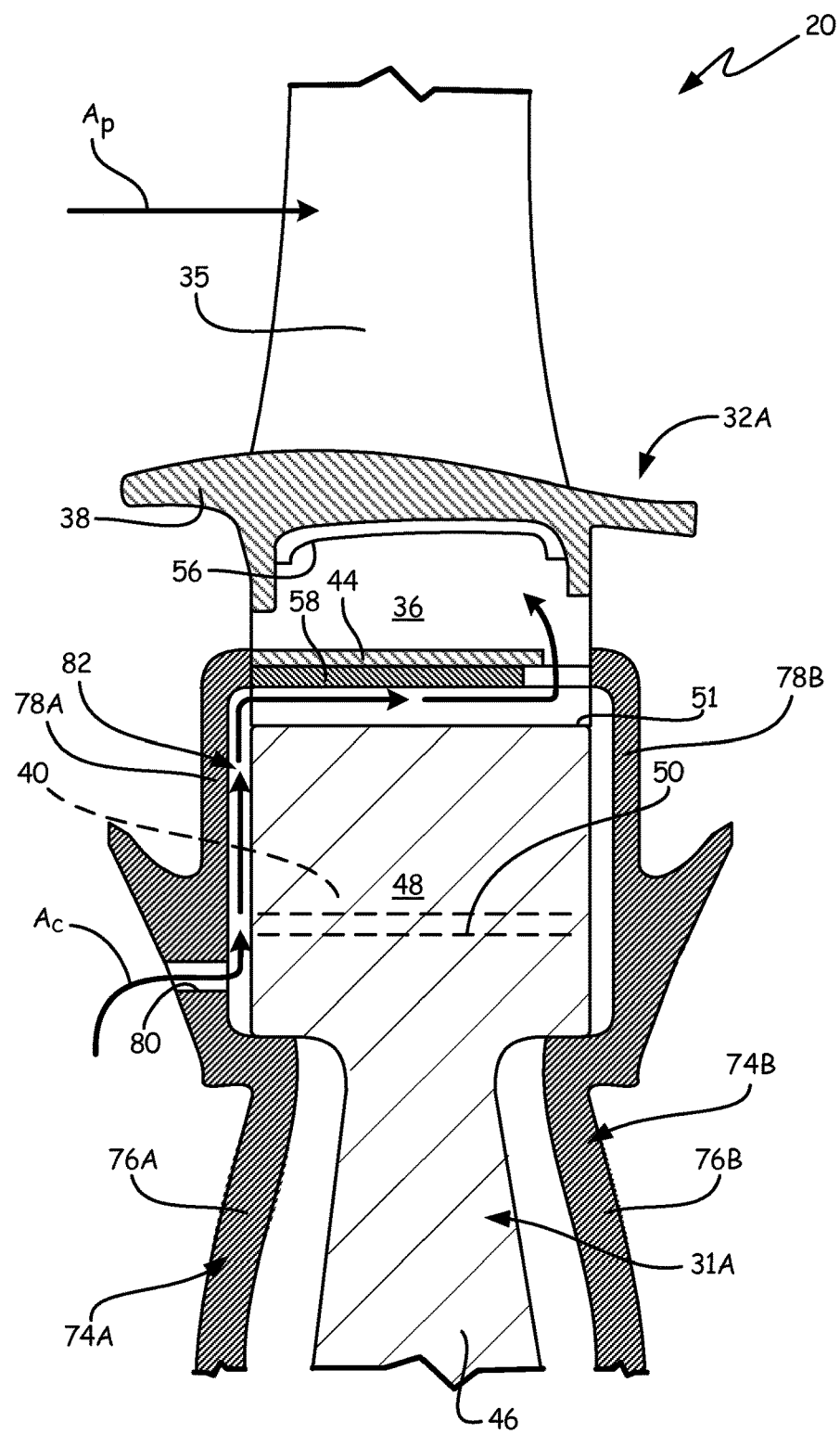
FIG. 6 is a cross-sectional view of an alternative embodiment of the high pressure turbine section of FIG. 1 in which a disk outer rim seal is retained in a rotor slot via a cover plate.

FIG. 6 is a cross-sectional view of an alternative embodiment of high pressure turbine section 20 of FIG. 1 in which disk outer rim seal 58 is retained in rotor slot 50 via cover plates 74A and 74B. HPT section 20 of FIG. 6 includes many of the same components as HPT section 20 of FIG. 2 and such components are numbered accordingly. However, in FIG. 6, HPT section 20 includes cover plates 74A and 74B that extend all the way to shank 36 of HPT blade 32A, rather than including seal plates Cover plate 74A includes disk portion 76A and seal portion 78A. Cover plate 74A additionally includes opening 80. Cover plate 74B includes disk portion 76B and seal portion 78B. Cover plate 74 acts similarly to cover plate 52A and seal plate 54A of FIG. 2. Specifically, disk portion 76A extends along disk 46 and engages rim 48 similarly to cover plate 52A. Disk portion 76A includes opening 80 to allow cooling air AC into cooling path 82. However, seal portion 78A extends integrally from disk portion 76A to engage shank 36 of blade 32A. Seal portion 78A thereby provides similar sealing function as seal plate 54A. Thus, separate sealing components, such as seal plate 54A, are not utilized. Furthermore, additional retention means, such as hooks 42A, are not needed. Seal portion 78A is cantilevered from disk portion 76A at rim 48 to engage shank 36 and nub 44, thereby preventing rim seal 58 from disengaging. Cover plate 74A thus provides dual retention and sealing function in a single component. Cover plate 74B functions similarly as cover plate 74A.

Discussion of Possible Embodiments

The following are non-exclusive descriptions of possible embodiments of the present disclosure.

A turbine section for a gas turbine engine comprising: a rotor comprising: a rim defining an outer diameter surface, and a slot through the rim across the outer diameter surface; a blade comprising: an airfoil, a platform surrounding a base of the airfoil, a shank extending from the platform opposite the airfoil, a root extending from the shank for connecting to the slot, and a nub extending from the shank beneath the platform; and a rim seal disposed between the outer diameter surface and the nub.

The turbine section of the preceding paragraph can optionally include, additionally and/or alternatively, any one or more of the following features, configurations and/or additional components:

a seal plate retained alongside the rotor adjacent an interface between the root and the slot;

a cover plate extending across the rotor to connect to the rim, and a hook extending from the shank of the blade, wherein the seal plate is retained alongside the rim by the cover plate and hook;

a cooling path comprising: an opening in the cover plate; a leakage gap between the seal plate and rim; and a passage between the outer diameter surface and the rim seal;

a cover plate comprising: a disk portion extending across the rotor to connect to the rim, and a seal portion extending from the disk portion and positioned adjacent an interface between the root and the slot, wherein the cover plate forms a cooling path comprising: an opening in the cover plate, a leakage gap between the seal portion and rim, and a passage between the outer diameter surface and the rim seal;

a gap seal disposed between the platform and the nub adjacent a mate face of the platform;

a rim seal that is reversible in the leading-edge-to-trailing-edge direction;

a rim seal that is scalloped at the trailing edge;

a rim seal that comprises: an elongate body extending axially across a majority of the outer diameter surface, the elongate body comprising: a leading edge; a trailing edge; a pressure side; and a suction side;

a rim seal that further comprises: a first pair of notches extending into the leading edge at the pressure and suction sides; and a second pair of notches extending into the trailing edge at the pressure and suction sides;

a nub that comprises an elongate shelf extending along the shank;

a nub that includes: a wing at the leading edge to extending circumferentially toward the rim seal; and a notch at the trailing edge to extend circumferentially away from the rim seal;

a rim seal that is spaced from about 0.020 inches (~0.508 mm) to about 0.080 inches (~2.032 mm) from the outer diameter surface.

A method for cooling an outer diameter of a rotor disk in a gas turbine engine comprises: bleeding a flow of cooling air in a gas turbine engine, passing the flow of cooling air through a seal plate retention cover plate, leaking the flow of cooing air between a rotor disk rim and the seal plate, and guiding the flow of cooling air across an outer diameter surface of the rotor disk rim utilizing a rim seal.

The method of the preceding paragraph can optionally include, additionally and/or alternatively, any one or more of the following features and/or additional steps:

inhibiting the flow of cooling air out of the rotor disk rim with an aft seal plate;

sealing the rim seal against retention nubs extending from adjacent blade shanks;

discharging the flow of cooling air through a window between a trailing edge of the rim seal and a nub that retains the rim seal;

inhibiting gas path air from contacting the outer diameter surface with the rim seal.

A gas turbine engine comprises: a rotor disk comprising: a rim having a plurality of slots in an outer diameter; and a plurality of disk lugs formed in the rim to overhang the plurality of slots; a plurality of blades coupled to the rotor disk, each blade comprising: a shank including: a root disposed at an inner diameter end of the shank and disposed in a slot to be retained by disk lugs; and a nub extending from the shank spaced radially outward from the root; and a plurality of rim seals, each rim seal disposed between a pair of adjacent disk lugs and a pair of adjacent nubs.

The gas turbine engine of the preceding paragraph can optionally include, additionally and/or alternatively, any one or more of the following features, configurations and/or additional components:

a cover plate extending across the rotor disk to connect to the rim; a hook extending from the shank of the blade; a seal plate retained alongside the rim by the cover plate and hook; and a cooling path comprising: an opening in the cover plate; a leakage gap between the seal plate and rim; and passages between the outer diameter surface and the rim seals.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine section for a gas turbine engine, the turbine section comprising:
   a rotor comprising:
      a rim defining an outer diameter surface;
      a slot through the rim across the outer diameter surface;
   a blade comprising:
      an airfoil;
      a platform surrounding a base of the airfoil;
      a shank extending from the platform opposite the airfoil;
      a root extending from the shank for connecting to the slot;
      a nub extending from the shank beneath the platform; and
   a rim seal disposed between the outer diameter surface and the nub, the rim seal comprising:
      an elongate body extending axially across a majority of the outer diameter surface, the elongate body comprising:
         a leading edge;
         a trailing edge;
         a pressure side; and
         a suction side.

2. The turbine section of claim 1 and further comprising a seal plate retained alongside the rotor adjacent an interface between the root and the slot.

3. The turbine section of claim 2 and further comprising:
   a cover plate extending across the rotor to connect to the rim; and
   a hook extending from the shank of the blade;
   wherein the seal plate is retained alongside the rim by the cover plate and hook.

4. The turbine section of claim 3 and further comprising a cooling path comprising:
   an opening in the cover plate;
   a leakage gap between the seal plate and rim; and
   a passage between the outer diameter surface and the rim seal.

5. The turbine section of claim 2 and further comprising:
   a cover plate comprising:
      a disk portion extending across the rotor to connect to the rim; and
      a seal portion extending from the disk portion and positioned adjacent an interface between the root and the slot;
   wherein the cover plate forms a cooling path comprising:
      an opening in the cover plate;
      a leakage gap between the seal portion and rim; and
      a passage between the outer diameter surface and the rim seal.

6. The turbine section of claim 1 and further comprising a gap seal disposed between the platform and the nub adjacent a mate face of the platform.

7. The turbine section of claim 1 wherein the rim seal is reversible in the leading-edge-to-trailing-edge direction.

8. The turbine section of claim 1 wherein the rim seal is scalloped at the trailing edge.

9. The turbine section of claim 1 wherein the rim seal further comprises:
   a first pair of notches extending into the leading edge at the pressure and suction sides; and a second pair of notches extending into the trailing edge at the pressure and suction sides.

10. The turbine section of claim 1 wherein the nub comprises an elongate shelf extending along the shank.

11. The turbine section of claim 1 wherein the nub includes:
   a wing at the leading edge extending circumferentially toward the rim seal; and
   a notch at the trailing edge, the notch extending circumferentially away from the rim seal.

12. The turbine section of claim 1 wherein the rim seal is spaced 0.020 inches to 0.080 inches from the outer diameter surface.

13. A method for cooling an outer diameter of a rotor disk in a gas turbine engine, the method comprising:
   bleeding a flow of cooling air in a gas turbine engine;
   passing the flow of cooling air through a cover plate that retains a first seal plate against the rotor disk;
   leaking the flow of cooing air between a rotor disk rim and the first seal plate; and
   guiding the flow of cooling air across an outer diameter surface of the rotor disk rim utilizing a rim seal; the rim seal comprising:
      an elongate body extending axially across a majority of the outer diameter surface, the elongate body comprising:
         a leading edge;
         a trailing edge;
         a pressure side; and
         a suction side.

14. The method of claim 13 and further comprising:
   inhibiting the flow of cooling air out of the rotor disk rim with a second seal plate.

15. The method of claim 13 and further comprising:
   sealing the rim seal against a retention nub extending from an adjacent blade shank.

16. The method of claim 13 and further comprising:
   discharging the flow of cooling air through a window between a trailing edge of the rim seal and a nub that retains the rim seal.

17. The method of claim 13 and further comprising:
   inhibiting gas path air from contacting the outer diameter surface with the rim seal.

18. A gas turbine engine comprising:
   a rotor disk comprising:
      a rim having a plurality of slots in an outer diameter; and
      a plurality of disk lugs formed in the rim to overhang the plurality of slots;
   a plurality of blades coupled to the rotor disk, each blade comprising:
      a shank including:
         a root disposed at an inner diameter end of the shank and disposed in a slot to be retained by a disk lug belonging to the plurality of disk lugs; and
         a nub extending from the shank spaced radially outward from the root;
   a plurality of rim seals, each rim seal disposed between an adjacent pair of disk lugs belonging to the plurality of disk lugs and a pair of adjacent nubs;
   a cover plate extending across the rotor disk to connect to the rim;
   a hook extending from the shank of the blade;
   a seal plate retained alongside the rim by the cover plate and hook; and
   a cooling path comprising:
      an opening in the cover plate;
      a leakage gap between the seal plate and rim; and
      passages between the outer diameter surface and the rim seals.

* * * * *